United States Patent
Higgins

(10) Patent No.: US 7,290,319 B2
(45) Date of Patent: Nov. 6, 2007

(54) METHODS FOR INSTALLING A FUEL PELLET LOCKING RETAINER IN A NUCLEAR FUEL ROD

(75) Inventor: Russel P. Higgins, Wilmington, NC (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 11/329,110

(22) Filed: Jan. 11, 2006

(65) Prior Publication Data

US 2007/0157452 A1     Jul. 12, 2007

(51) Int. Cl.
  *B23P 11/00* (2006.01)
  *B23P 19/00* (2006.01)
  *G21C 3/00* (2006.01)
(52) U.S. Cl. .......................... 29/435; 29/446; 29/450; 29/451; 29/464; 29/469; 29/723; 29/225; 29/227; 376/412; 376/418; 376/451
(58) Field of Classification Search .............. 376/412, 376/418, 428, 451; 976/DIG. 52; 29/435, 29/446, 450, 451, 452, 464, 469, 723, 225, 29/227, 229
  See application file for complete search history.

(56) References Cited

U.S. PATENT DOCUMENTS

| | | | | |
|---|---|---|---|---|
| 2,210,061 A | * | 8/1940 | Caminez | 29/240.5 |
| 2,300,057 A | * | 10/1942 | Meyer | 285/114 |
| 2,329,286 A | * | 9/1943 | Meyer | 29/227 |
| 2,367,945 A | * | 1/1945 | Jorgensen | 29/81.17 |
| 3,034,869 A | * | 5/1962 | Peterson | 422/311 |
| 3,115,701 A | * | 12/1963 | Jones | 29/453 |
| 3,781,970 A | * | 1/1974 | Ferdriksson | 29/446 |
| 3,963,566 A | * | 6/1976 | MacMillan et al. | 376/412 |
| 4,871,509 A | | 10/1989 | Johansson | |
| 4,944,912 A | * | 7/1990 | Schlomm et al. | 376/420 |
| 5,255,298 A | * | 10/1993 | Johansson et al. | 376/412 |
| 5,317,612 A | * | 5/1994 | Bryan et al. | 376/451 |
| 5,329,566 A | * | 7/1994 | King | 376/418 |
| 5,564,172 A | * | 10/1996 | Klann | 29/227 |
| 6,182,363 B1 | * | 2/2001 | Venable | 29/888.4 |

(Continued)

*Primary Examiner*—Essama Omgba
(74) *Attorney, Agent, or Firm*—Nixon & Vanderhye, PC

(57) ABSTRACT

A method for installing a locking retainer in a tube to maintain internal components within the tube under compression comprising the steps of: a) providing an elongated retainer spring having large and small diameter sections with the large diameter section of a size for an interference fit with the interior diameter of the tube and the smaller diameter section of a size having a clearance with the interior diameter of the tube; b) inserting a smaller diameter section of an elongated tool into the larger diameter section of the elongated retainer spring; c) engaging a transition between the smaller and larger diameter sections of the tool against a transition between the larger and smaller diameter sections of the elongated retainer spring; d) inserting the combined tool and retainer spring into an open end of the tube containing internal components with an end of the smaller diameter section of the retainer spring entering the tube first; e) advancing the combined tool and retainer spring within the tube to compress the smaller diameter spring against an adjacent internal component until an end of the tool engages the adjacent internal component enabling the spring to apply a selected axial preload on the internal components in the tube; and f) withdrawing the tool from the retainer spring.

4 Claims, 3 Drawing Sheets

U.S. PATENT DOCUMENTS 6,470,554 B1 * 10/2002 Aubarede et al. ............. 29/450
6,898,260 B2 * 5/2005 Garzarolli et al. .......... 376/416
7,010,078 B2 * 3/2006 Helmersson ................ 376/412
7,127,024 B2 * 10/2006 Garzarolli et al. .......... 376/416

* cited by examiner

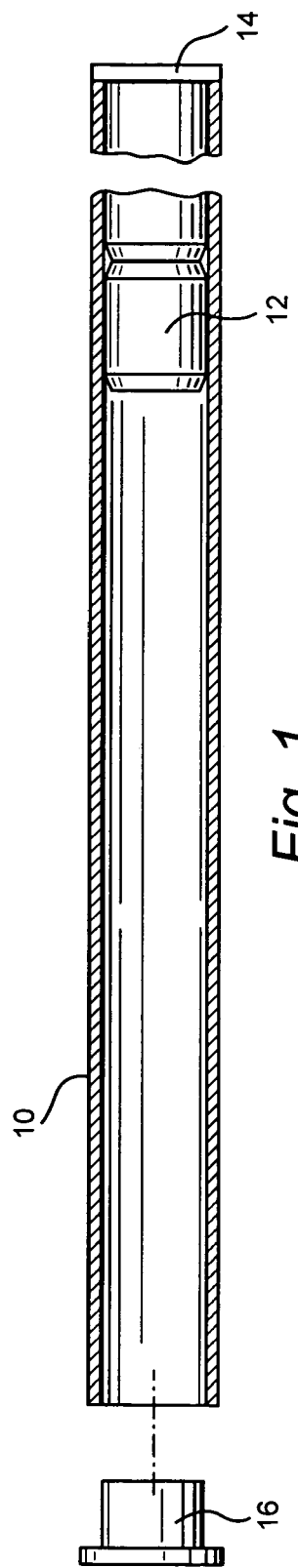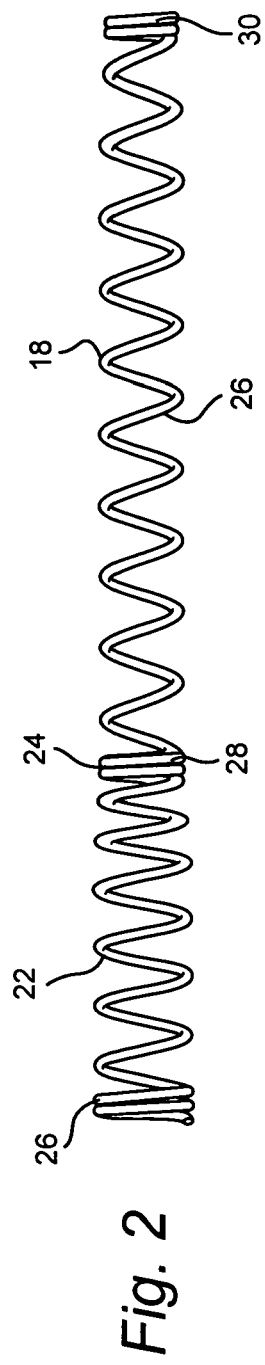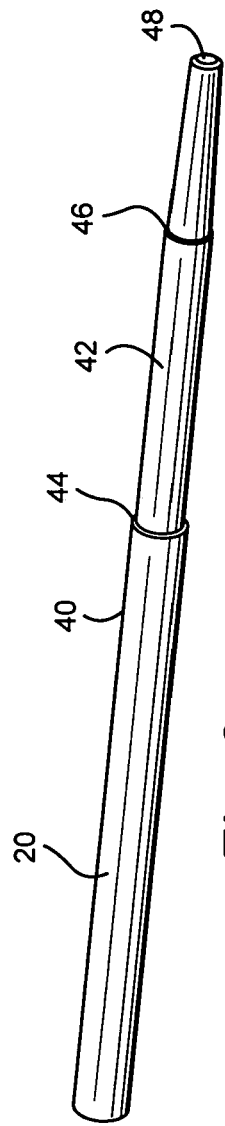
Fig. 1
Fig. 2
Fig. 3

METHODS FOR INSTALLING A FUEL PELLET LOCKING RETAINER IN A NUCLEAR FUEL ROD

BACKGROUND OF THE INVENTION

The present invention relates to methods for maintaining the fuel pellets within a nuclear fuel rod under compression and particularly relates to methods for installing a locking retainer in a nuclear fuel rod to maintain a predetermined axial preload on the fuel pellets within the fuel rod.

In U.S. Pat. No. 4,871,509 issued Oct. 3, 1989, of common assignee herewith, there is illustrated a fuel column retainer using a coiled spring to maintain the fuel pellets under compression within the nuclear fuel rod. Two designs are disclosed in that patent. Both disclosed designs require features on a coil spring so that torsion can be applied by an installation tool to the upper coils of the retainer spring. The torsion reduces the coil diameter of the upper coils allowing the spring to be located inside the fuel rod. On the upper end, both designs of that patent have a tang formed by the end of the spring coil extending axially from the upper coils. On the bottom end, one design has a wafer with a slot that is welded to the bottom of the spring. The other design has a partial coil in between the upper and lower coils. These features however render the retainer difficult and expensive to produce and complicate the installation process.

More particularly, the installation tooling in that patent includes a rod that extends through the upper coils with a feature on the bottom to engage either the slotted wafer or the partial coil. The rod extends through a sleeve that has a slot designed to engage the axial tang above the upper spring coils. With both the sleeve and the rod engaging the spring features, the sleeve can be rotated relative to the rod applying torsion to the upper coils and reducing their diameter to enable insertion in the fuel rod. This is a complex and time consuming process in that the spring must first be loaded onto the tool then the parts of the tool are rotated to allow insertion. The tool must also then be located in the proper axial position while the torsion between the rod and the sleeve is maintained. Torsion can then be released and the tool withdrawn. The process is cumbersome, time consuming and difficult to automate. It also typically slows down the assembly of the fuel rod. Accordingly, there is a need for a new and simplified design and installation process and which process includes a spring and tooling which are low cost and have the capacity for automation.

BRIEF DESCRIPTION OF THE INVENTION

In a preferred embodiment of the present invention, there is provided a method for installing a locking retainer in a tube to maintain internal components within the tube under compression comprising the steps of: a) providing an elongated retainer spring having large and small diameter sections with the large diameter section of a size for an interference fit with the interior diameter of the tube and the smaller diameter section of a size having a clearance with the interior diameter of the tube; b) inserting a smaller diameter section of an elongated tool into the larger diameter section of the elongated retainer spring; c) engaging a transition between the smaller and larger diameter sections of the tool against a transition between the larger and smaller diameter sections of the elongated retainer spring; d) inserting the combined tool and retainer spring into an open end of the tube containing internal components with an end of the smaller diameter section of the retainer spring entering the tube first; e) advancing the combined tool and retainer spring within the tube to compress the smaller diameter spring against an adjacent internal component until an end of the tool engages the adjacent internal component enabling the spring to apply a selected axial preload on the internal components in the tube; and f) withdrawing the tool from the retainer spring while maintaining the larger diameter section of the retainer spring in engagement with the interior diameter of the tube to maintain the axial preload on the internal components.

In the exemplary embodiment, the tube is a nuclear fuel rod and the internal components are fuel pellets.

BRIEF DESCRIPTION OF THE DRAWINGS

FIG. 1 is a fragmentary cross-sectional view of a fuel rod illustrating a series of fuel pellets within the rod;

FIG. 2 is a side elevational view of a spring for use in the present installation method;

FIG. 3 is a perspective view of a tool for use in the present installation method.

DETAILED DESCRIPTION OF THE INVENTION

Figure 4:
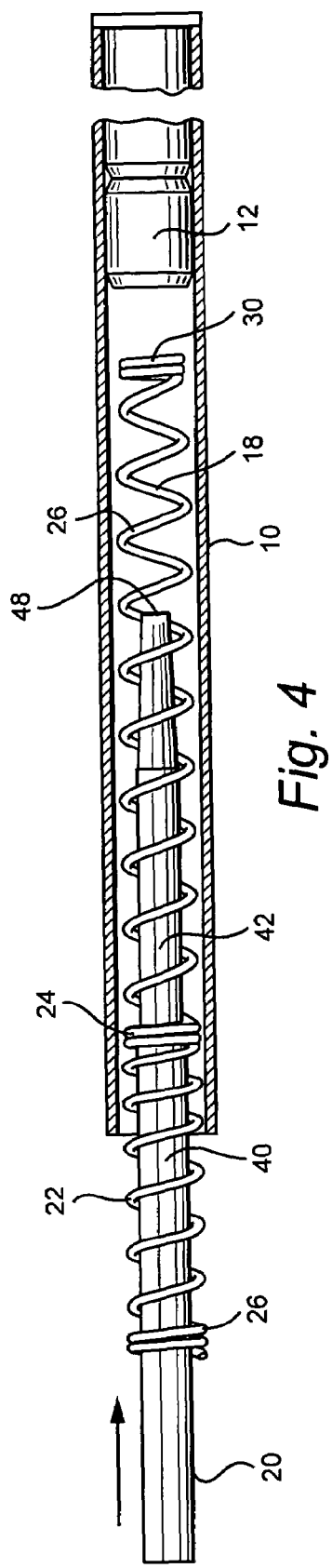
FIGS. 4, 5, 6 and 7 are views illustrating the sequence of steps to install the locking retainer in the fuel rod.
Figure 5:
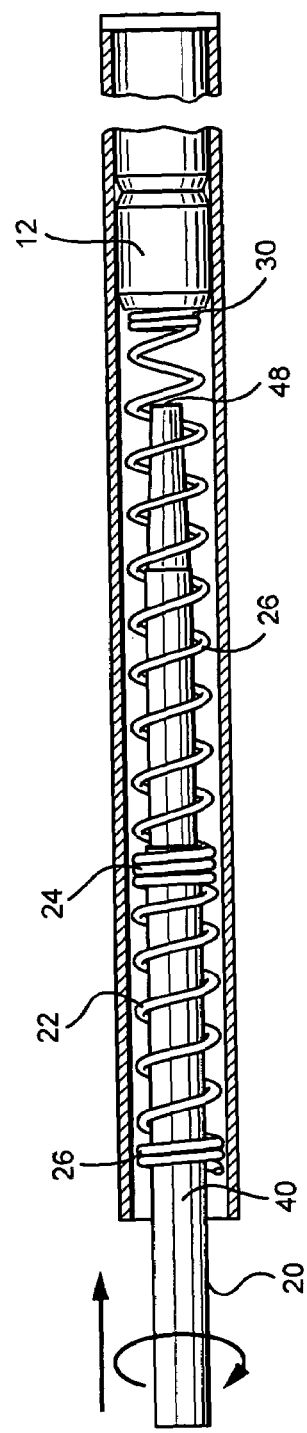
Figure 6:
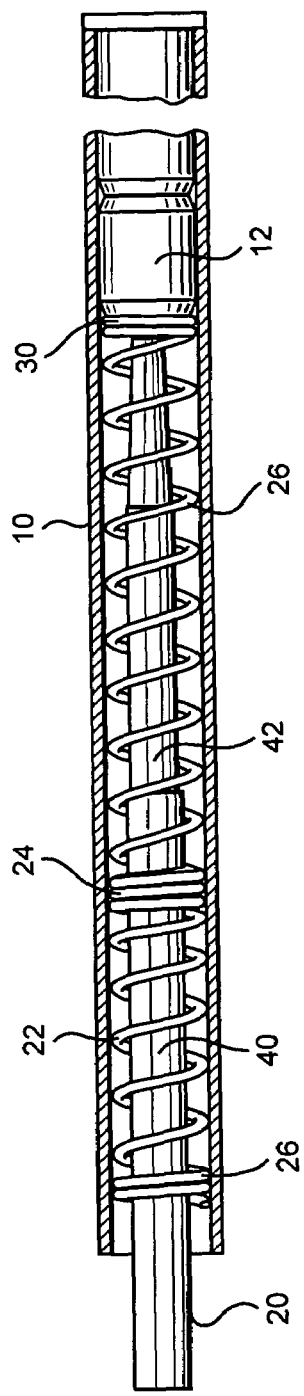
Figure 7:
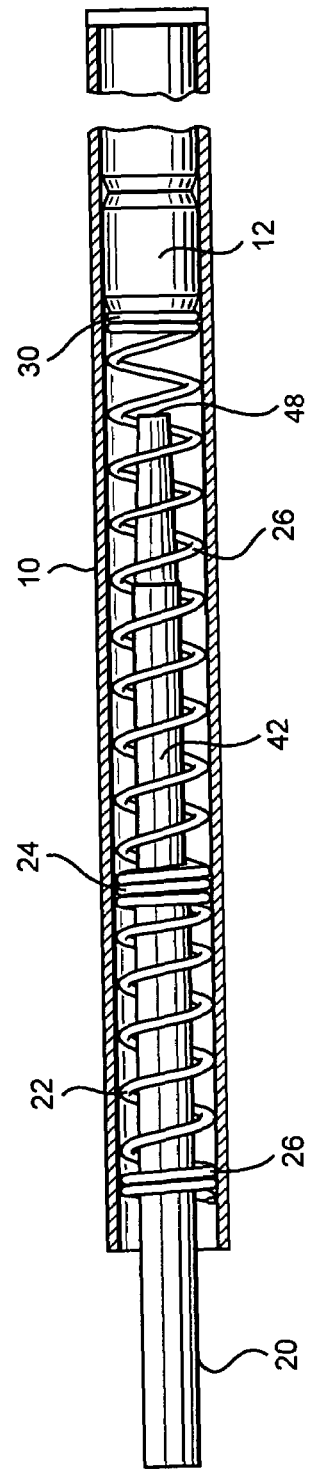

Referring now to the drawings, particularly to FIG. 1, there is illustrated a fuel rod 10 containing a plurality of nuclear fuel pellets 12 stacked one against the other and against a closed end 14 of the fuel rod. Prior to closing the opposite end of the fuel rod by welding a fuel rod plug 16 to the fuel rod 10, it is necessary and desirable to axially preload the column of fuel pellets within the fuel rod.

To accomplish the foregoing, a locking retainer spring 18 is provided for disposition within the fuel rod and to maintain a pre-selected preload against the stacked fuel pellets 12 within the fuel rod 10. FIG. 3 illustrates an installation tool 20 for use in installing the locking retainer spring 18 within the fuel rod 10 prior to sealing the pellets 12 within the fuel rod 10 by welding the plug 16 to rod 10. As illustrated in FIG. 2, the retainer spring 18 includes a plurality of upper coils 22, a transition section 24 and a lower coil section 26. The upper spring coil section 22 has a diameter corresponding to the interior diameter of the fuel rod 10 such that an interference fit exists between the upper coiled section 22 and the fuel rod upon installation of the retainer spring 18 into the fuel rod 10. The upper coil section 22 includes a pair of closely wound coils 26 at the upper end of the retainer spring 18 and a pair of closely wound coils 28 at the lower end of the upper coiled section 22. The latter coils 28 form the transition section 24. The transition section 24 separates the larger diameter upper coiled section 22 from the smaller diameter lower coiled section 26. Thus, the lower coiled section 26 has a natural clearance relative to the inner diameter of the fuel rod. The lower coiled section 26 also terminates at its far or lower end in a pair of closely wound coils 30. The closely wound coils 30 terminate in a ground flat to provide an interface with the upper most pellet 12 of the column of fuel pellets within the fuel rod 10. In summary, the retainer spring 18 includes an upper coiled section having an outer diameter corresponding to the interior diameter of the fuel rod 10 and a lower coiled section 26 having a diameter less than and clear of the interior diameter of the fuel rod 10.

Referring to FIG. 3, there is illustrated an installation tool 20. The tool 20 includes a solid preferably metal rod having a first diameter section 40, a smaller diameter section 42 and a transition section 44 between the large and small diameter sections 40 and 42. The smaller diameter section 42 opposite transition 44 includes a further transition 46 enabling the rod to taper toward distal end 48. The larger and smaller diameter sections 40 and 42 respectively are cylindrical.

Referring now to drawing FIGS. 4-7, the process for installing the locking retainer spring 18 within the fuel rod 10 will now be described. It will be appreciated that the fuel pellets 12 are located within the fuel rod through the open end and butt or stack against one another within the fuel rod. As is conventional, the fuel pellets extend within the fuel rod a distance short of the open end of the rod and also short of the plug 16 when applied to close the upper end of the fuel rod. Consequently, it is desirable to maintain the fuel pellets 12 continuously under a pre-selected compressive loading to maintain the pellets in appropriate position within the rods and to prevent movement of the pellets in an axial direction along the rods both when transporting the fuel rods and using the fuel rods in a nuclear reactor.

To install the locking retainer spring 18 in a manner to accomplish that purpose, the smaller diameter end i.e., the distal end 48 of the tool 20 is inserted into the upper end of the locking retainer spring 18, particularly through the open free end of the larger diameter section 22. As the rod 20 is inserted into the retainer 18, the transition 44 on the rod 20 will engage the transition 24 on the retainer spring 18. That is, the tool transition 44 seats against the retainer spring transition 24. The combined tool and spring is then inserted into the open end of the fuel rod 10 as illustrated in FIG. 4. Since the diameter of the transition section 24 is the same or substantially the same diameter as the interior diameter of the fuel rod 10, the diameter transition of the spring 18 will start to interfere with the interior diameter of the fuel tube 10. A combination of axial force and torque is then applied to the tool 20 to force the combined tool and spring into further penetration within the fuel rod. This can be accomplished by a combination of axial force and torque applied to the tool 20. Note that the torsion applied to the tool is transmitted to the bottom of the upper coils 22 on the spring adjacent the transition section 24 and acts to reduce the diameter of the upper coils to further facilitate insertion. The torque and axial force on the tool is transmitted to the upper coils 22 of the spring such that those forces act to overcome the friction between the upper spring coils 22 and the interior surface to enable the tool and spring to advance into the fuel rod, i.e., into the interior diameter of the fuel rod. The balance of the upper coils are then advanced into the fuel rod by the axial force and torsion applied to the tool.

The combined tool and spring are inserted into the fuel rod until the tip 30 of the lower coiled section 26 of the spring 18 engages against the uppermost fuel pellet 12. At this point, the lower coiled section 26 of the spring 18 is not yet compressed and lies its natural state within the fuel rod 10. (See FIG. 5). The length of the tool 20 is set to give the proper spring deflection to the lower coils and thereby the correct preload is maintained on the fuel column. The tool and spring are further advanced until such time that the distal end 48 of tool 20 engages the end of the fuel pellet 12. Once the distal end 48 engages the adjacent fuel pellet 12, the correct preload on the fuel column is obtained because of the dimensional relationships between the length of the tool and the lower coils. Once the tool seats against the fuel pellet, the tool is withdrawn from within the coil spring and the friction between the upper coils 22 and the interior diameter of the fuel rod maintains the axial preload on the fuel column. At this juncture, the end 26 of the upper coils of the spring is set back from the end of the fuel rod and is set back likewise from the plug 16 when the plug is welded to the end of the fuel rod. It will be appreciated that there is no necessity to reduce the diameter of the upper coils in this installation process when inserting the spring. Also, the spring can be readily manufactured by standard spring coiling equipment. Further the installation tool is very simple and the installation procedure is easily accomplished manually or by automated equipment.

It will also be appreciated that the method described herein is also applicable to the retention of any internal components within a tube.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for installing a locking retainer in a tube to maintain internal components within the tube under compression comprising the steps of:
    a) providing an elongated retainer spring having large and small diameter sections with the large diameter section of a size for an interference fit with the interior diameter of the tube and the smaller diameter section of a size having a clearance with the interior diameter of the tube;
    b) inserting a smaller diameter section of an elongated tool into the large diameter section of the elongated retainer spring;
    c) engaging a transition between the smaller diameter section of the elongated tool and a larger diameter section of the elongated tool against a transition between the large and small diameter sections of the elongated retainer spring;
    d) inserting the combined tool and retainer spring into an open end of the tube containing internal components with an end of the small diameter section of the retainer spring entering the tube first;
    e) advancing the combined tool and retainer spring within the tube to compress the small diameter section of the retainer spring against an adjacent internal component until an end of the tool engages the adjacent internal component enabling the spring to apply a selected axial preload on the internal components in the tube; and
    f) withdrawing the tool from the retainer spring while maintaining the large diameter section of the retainer spring in engagement with the interior diameter of the tube to maintain the axial preload on the internal components.

2. A method according to claim 1, including advancing the combined tool and retainer spring within the tube to engage the spring transition with the interior diameter of the tube and subsequently rotating the combined tool and retainer spring to advance the large diameter section of the retainer spring into the tube.

3. The method according to claim 1 wherein the tube comprises a nuclear fuel rod.

4. The method according to claim 3 wherein the internal components comprise fuel pellets.

* * * * *